United States Patent [19]

Rodriguez et al.

[11] Patent Number: 4,504,505

[45] Date of Patent: Mar. 12, 1985

[54] METHOD FOR MAGNETICALLY SEPARATING NUTSHELLS FROM NUTMEATS

[76] Inventors: Vincent L. Rodriguez, 1310 Cambridge Rd., San Marino, Calif. 91108; Rudolph R. Rodriguez, 735 Camellia Dr., Covina, Calif. 91723

[21] Appl. No.: 535,938

[22] Filed: Sep. 26, 1983

[51] Int. Cl.³ .................. A23N 5/00; B03C 1/00
[52] U.S. Cl. ..................... 426/482; 99/568; 209/214; 209/226; 426/308
[58] Field of Search ............ 426/482, 481, 308, 289, 426/632; 99/568; 209/219, 214, 226

[56] References Cited

U.S. PATENT DOCUMENTS

| | | | |
|---|---|---|---|
| 813,404 | 2/1906 | Cook | 209/215 |
| 1,405,690 | 2/1922 | Herr | 209/8 |
| 1,832,737 | 11/1931 | Rassi | 426/308 |
| 2,007,177 | 7/1935 | Brogden | 426/308 |
| 2,020,533 | 11/1935 | Zaloom | 426/308 |
| 2,237,442 | 4/1941 | MacFarlane | 426/482 |
| 2,828,010 | 3/1958 | Gompper | 209/214 |
| 2,900,076 | 8/1959 | Israelson et al. | 209/215 |
| 3,527,646 | 9/1970 | Scheick et al. | 426/289 |
| 3,901,795 | 8/1975 | Smith et al. | 209/214 |
| 3,926,789 | 12/1975 | Shubert | 209/214 |

OTHER PUBLICATIONS

"Magnetic Separation of Seeds"; Brandenburg, May 1977, Technical Bulletin 137, Agricultural Experiment Station, Oregon State University.
Krishnan et al., "Separation of Shells from Walnut Meats Using Magnetic Methods", Dec. 1983.
Krishnan et al., "Magnetic Fluid-Aided Separation of Contaminants from Crop Seeds", 1983 ASAE Transactions.

Primary Examiner—George Yeung
Attorney, Agent, or Firm—Christie, Parker & Hale

[57] ABSTRACT

A method and apparatus for magnetic removal of nutshells from nutmeats is set forth wherein whole nuts are supplied to a glue applicator where they are covered with a water soluble glue. The covered nuts are sent to a normalizer which tumbles and conveys the nut and dissolves the binder to a substantially uniform, optimally thick coating. From the normalizer, the binder nuts are fed into a dusting drum which dusts iron filings, onto the coating and the nutshell. The coated nuts leaving the dusting drum are conveyed to a cracker which cracks the nutshells to separate the nutmeats therefrom. Cracked nutshells and nutmeats leaving the cracker is sent to a magnetic separator. To separate the coated nutshells from the nutmeat, the aggregate is conveyed past a magnetized roller, the shells being pulled from the aggregate by the roller and deposited onto a conveyor which transports the shells for collection or reprocessing. The separated shells may be sent without additional processing to be re-cracked to release more nutmeat, the aggregate being passed through a separator to remove the shells therefrom leaving behind the nutmeats.

28 Claims, 23 Drawing Figures

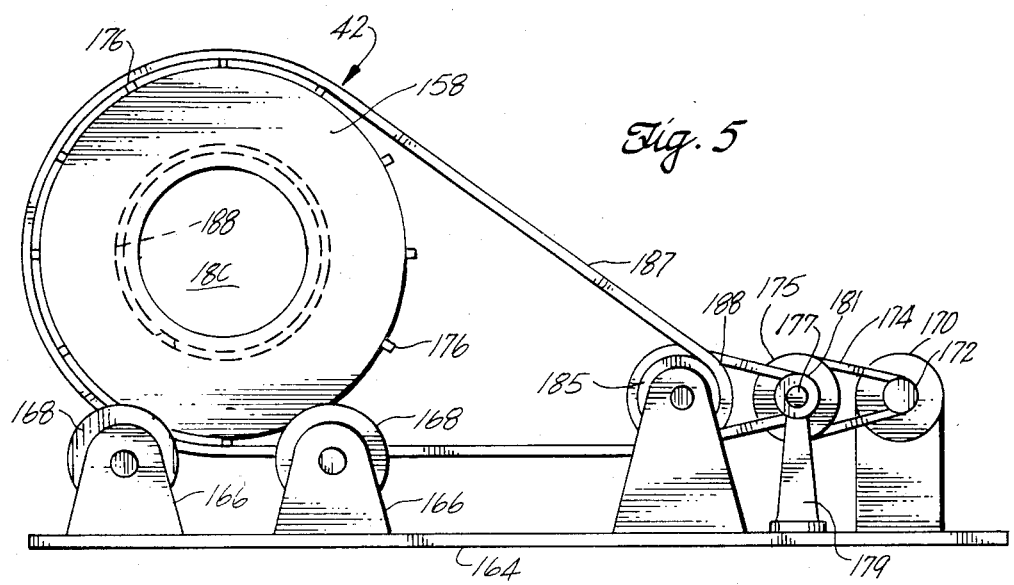
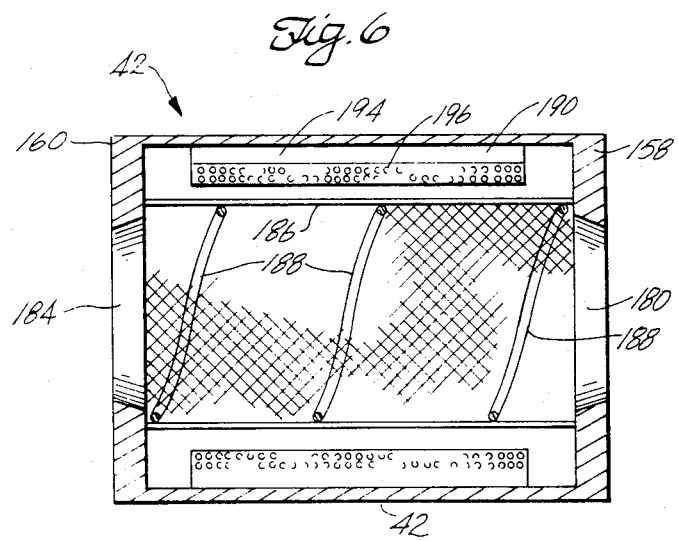

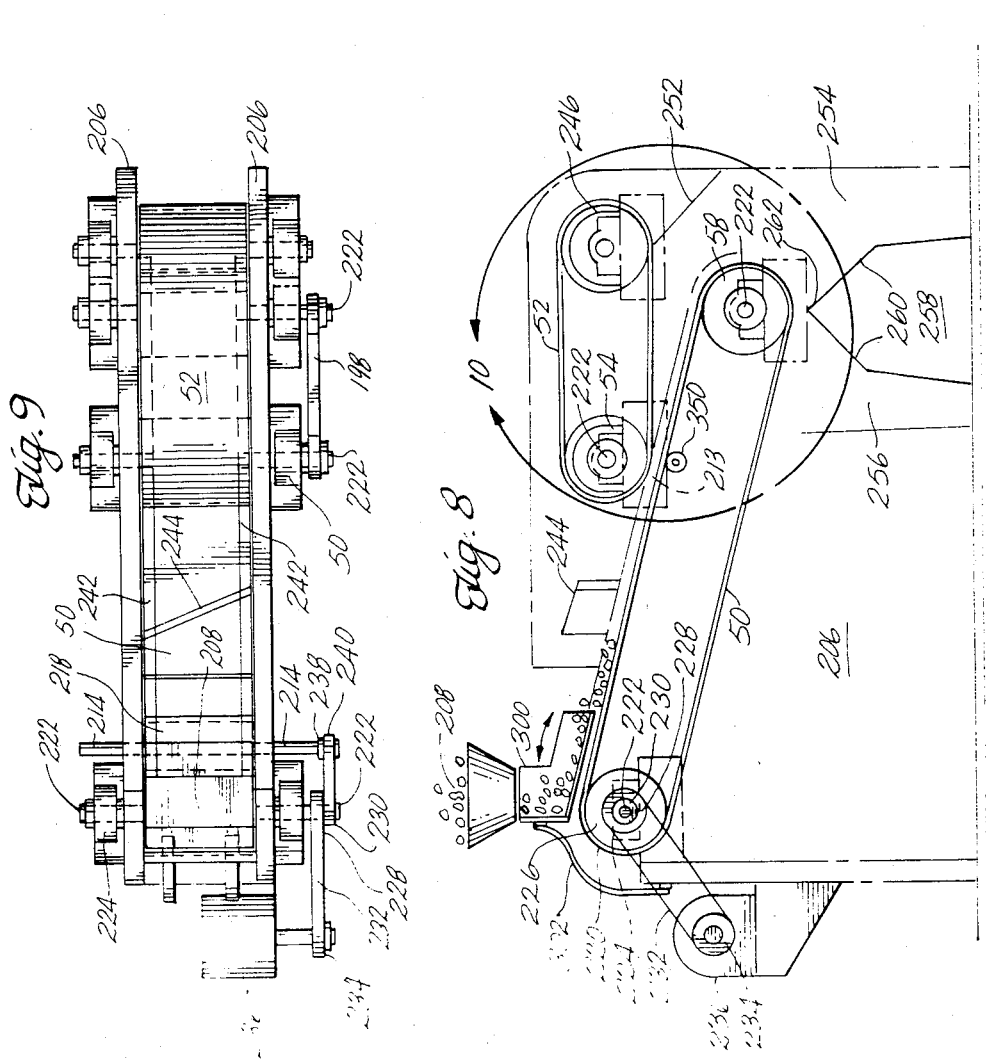

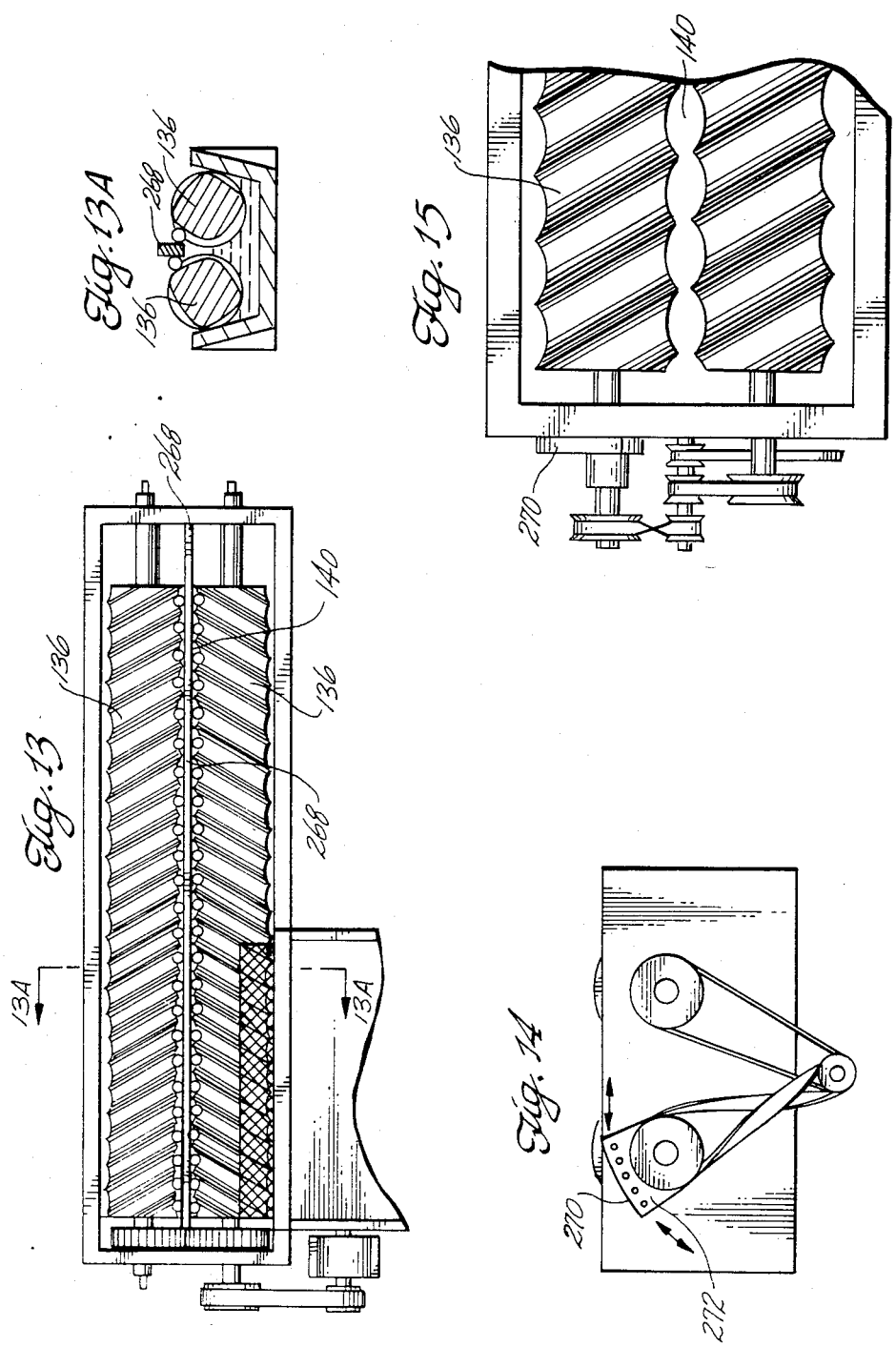

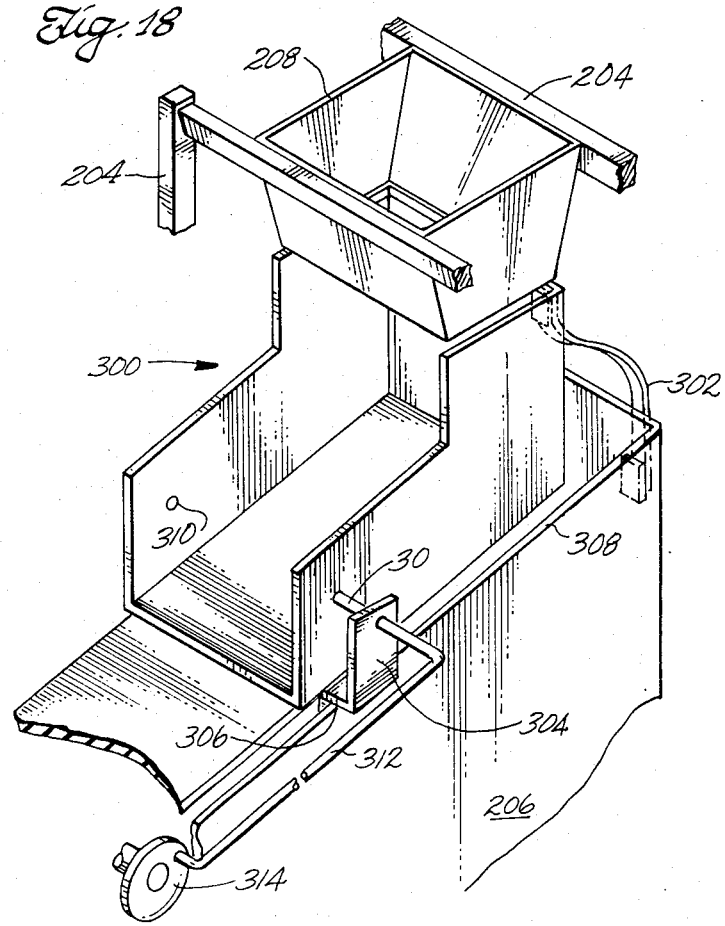
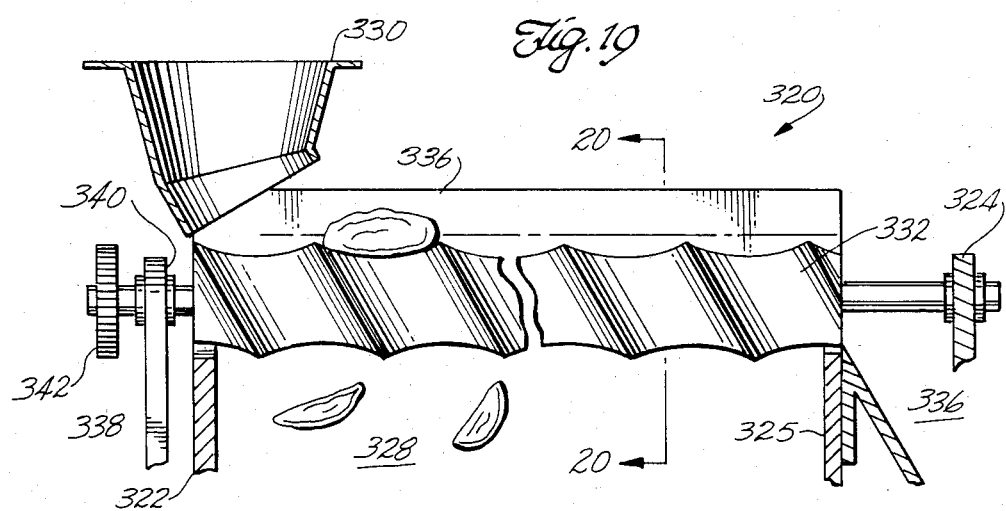

METHOD FOR MAGNETICALLY SEPARATING NUTSHELLS FROM NUTMEATS

FIELD OF THE INVENTION

This invention relates to nutshelling and more particularly to magnetic separation of nutshells from nutmeats.

BACKGROUND OF THE INVENTION

A perplexing problem faced in the commercial production of nuts and certain seeds is the separation of the shell or husk from the sought after meat. A good example is the English walnut. Handcracking of the nutshell and separation of the meat was the traditional and remains the most efficient means in terms of separating the nutmeat, which represents 42 to 44 percent of the total weight of the nut, from the nutshell. However, for large scale producers, hand cracking and separation is not suitable from a time and cost of labor standpoint.

Accordingly, mass cracking and separation methods and apparatus have been developed. One known method for separating meats from the shells is disclosed in U.S. Pat. No. 2,237,442, issued April 8, 1941 to MacFarlane entitled "Method of Shelling Nuts". By this method, whole nuts are loaded into a trommel where they are immersed in and covered by a substance such as a copper-bronze powder with pyroxylin base vehicle and acetone thinner. A portion of the trommel is perforated so that excess substance can be collected. The nuts are then dried in a tower and sent to a cracking machine. The cracked nutshells and meat aggregate leaving the cracking machine is fed into a floatation tank wherein the shells sink to the bottom and the meats float to the top. The separated shells and meats are then collected and the shells are sent for recovery of the substance.

One drawback of this type of separation method is that the trommel applies a non-uniform, non-optimum coating on the nuts. Accordingly, more than the required amount of substance is used adding to the cost of supplying and recovery of the substance. Furthermore, an overly thick, non-uniform covering tends to cause the nuts to agglomerate into an unmanageable mass which is difficult to dry and process. A thick coating is also subject to breaking or flaking away from the nut shell when the nut is cracked. Another associated problem is that process equipment must be dedicated to drying the overly coated nuts which again translates into processing costs.

Regarding recovery, often the discarded nutshells are used as filler, fuel, cosmetics or the like and accordingly the substance, which is toxic, must be removed. As can be appreciated, an overly abundant covering complicates and adds to the expense of the recovery step.

Another drawback of the above described method is the wetting of the nutshells during the separation by floatation. Should some meats be retained in the shell, additional cracking requires an intermediate drying step, again complicating the process and adding to the cost of separation.

A further disadvantage of this method is that, in the floatation tank, the nutmeats are wetted by the liquid in the tank. The coated shell pieces are also in this liquid which can have the shell coating dissolved therein, thus leading to contamination of the meats. Also, because the meats are wetted in the tank, they must be dried pursuant to a further step in the method.

SUMMARY OF THE INVENTION

There is, therefore, provided in the practice of the preferred embodiment of the present invention, a method and apparatus for magnetic removal of nutshells from an aggregate of cracked nutshells and nutmeats. In this method, whole nuts are supplied to a glue applicator where they are covered with a water soluble binder. The covered nuts are sent to a normalizer which tumbles and conveys the nuts and dissolves the binder to a substantially uniform, optimally thick coating. Preferably, the normalizer consists of a pair of cooperating, counterrotating screws. From the normalizer, the nuts are conveyed to a dusting drum which tumbles the coated nuts with magnetic particles such as iron filings which are captured by the coating. Upon leaving the dusting drum or shortly thereafter, the coating hardens to bind the magnetic substance to the nutshells. Thereafter, the coated nuts are sent to a cracker which cracks the nutshells to free the nutmeats and produce an aggregate of loose nutshells and nutmeats. To separate the nutshells from the aggregate and leave behind the nutmeats, the aggregate is fed to a separator. At the separator, the aggregate is moved relative to at least one magnetic field. The magnetic field attracts and separates the coated nutshells from the aggregate leaving behind the desired nutmeats. Preferably, the aggregate is conveyed past a magnet which pulls the shells from the aggregate and deposits them onto conveying means which, in turn, transports the nutshells away from the nutmeats.

BRIEF DESCRIPTION OF THE DRAWINGS

FIG. 3A is a partial side view of the apparatus of FIG. 2 showing means for preventing nuts from jamming the apparatus;

FIG. 5 is a view of the dusting drum taken along the line 5—5 of FIG. 4;

FIG. 6 is a section view of the dusting drum of FIG. 4;

FIG. 8 is a side view of the nutshell separator with the frame shown in phantom;

FIG. 9 is a top view of the separator of FIG. 8;

FIG. 13 is a top view of a normalizer modified to accommodate different sized nuts;

FIG. 13A is a section view of a normalizer of FIG. 13 taken along line 13A—13A;

FIG. 14 is an end view of the normalizer of FIG. 2 showing adjustment to accommodate smaller sized nuts;

FIG. 15 is a top view of a portion of the normalizer of FIG. 14;

FIG. 18 is a perspective view of the feed funnel of the separator of FIGS. 8–10;

FIG. 19 is a partial side elevation view of a classifier for separating whole nuts from a quantity of whole nuts and nut pieces;

DETAILED DESCRIPTION

Figure 1:
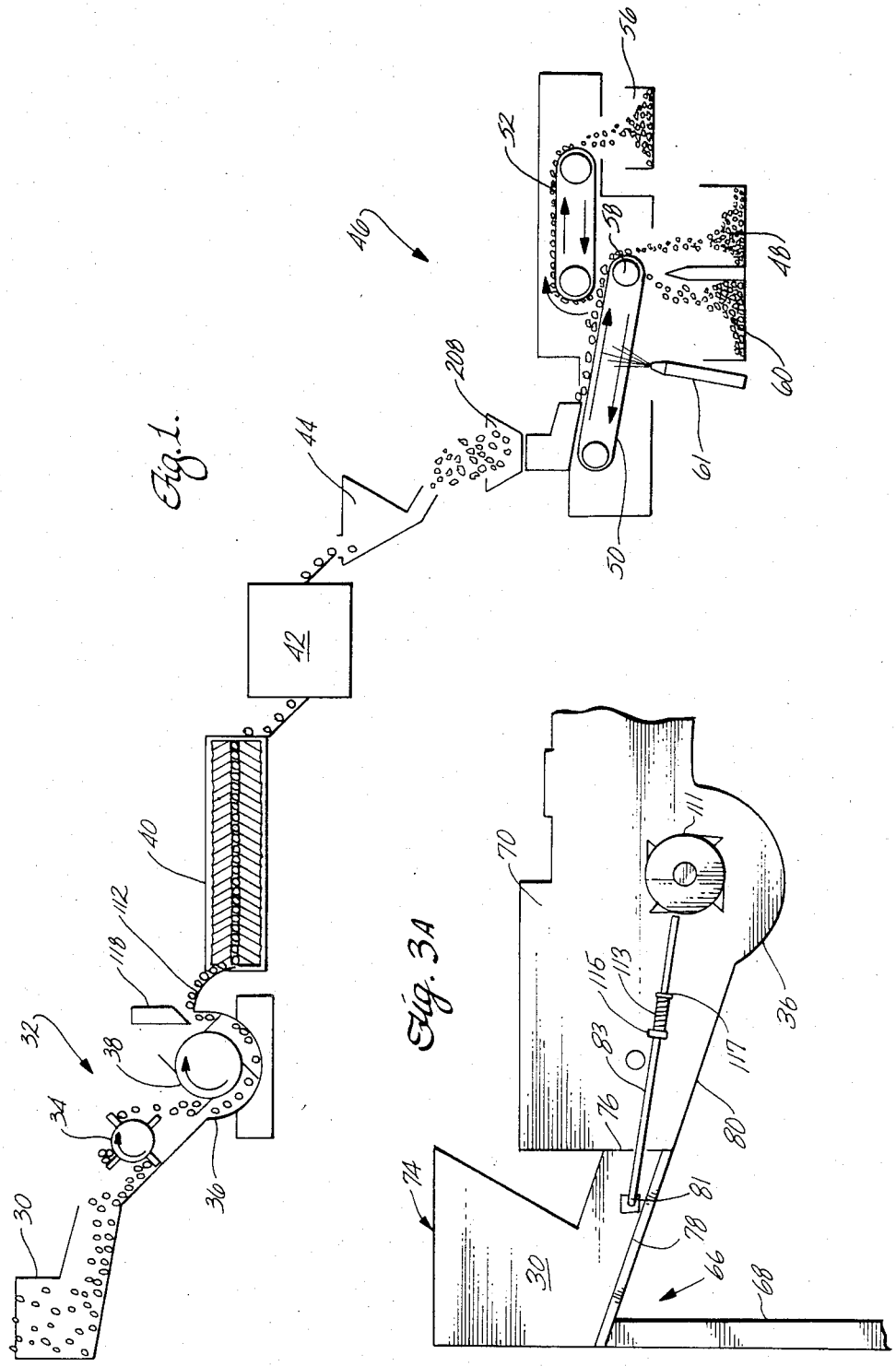
FIG. 1 is a schematic view illustrating the method according to the present invention.

Turning to the drawings, FIG. 1 schematically shows the broad aspects of the method for magnetically separating nutshells from nutmeats according to the present invention. While the following description is directed primarily to the shelling of English walnuts, it is to be understood that it is equally applicable to other types of nuts or large seeds such as pecans.

Referring to FIG. 1, whole nuts are fed into a hopper 30 of a glue applicator, shown generally as 32. From the hopper 30, the nuts are metered by a metering roll 34 to a glue applicator basin 36. In the basin 36, the nuts are immersed in a binder which preferably is a water-soluble animal glue. However, it is to be understood that any suitable glue could be substituted therefor. A dip roll 38 positively drives the nuts through the basin 36 to a normalizer 40.

At the normalizer 40, excess glue on each nut is removed and the glue on each nut is diluted and spread over the nut to produce a uniform, optimally thick coating. By optimum, what is meant is that the coating contains just the sufficient amount of glue to facilitate processing the nut as hereinafter described. Excess glue on the nutshell translates into additional processing costs, i.e., too much glue being used to coat the nut which must be replaced in the process, slow drying of the coating, slowing down the process or requiring an intermediate drying step and, in overly elaborate recovery steps to remove the glue from the shells. Furthermore, an overly thick coating of glue tends to cause the nuts to stick together in an unmanageable mass before cracking. An optimum coating, therefore, uses a minimal amount of glue for efficient and cost effective processing of the nut. From the normalizer 40, the nuts are transported to a dusting drum 42 where the glue-coated nuts (the glue coating being only partially set to a desired degree so that the glue has a selected residual tackiness) are mixed with a particulate magnetic substance such as iron filings. The iron filings adhere to the glue coating on the nutshell, the coating hardening shortly after the nuts leave the drum.

From the drum 42, the nuts are transported to a nutcracker 44 of known construction where the nutshells are cracked, freeing the nut meats from the coated nutshells. The output of the cracker 44, which consists of cracked shells, meats, meat membrane hereinafter referred to as chafe and any loose iron filings (the combination of which will hereinafter be referred to as aggregate) is fed into a separator 46.

At the separator 46, the aggregate is moved relative to a magnetic field. Preferably, the means for relative movement is to transport the aggregate toward a meat collection bin 48. The transporting method may be by means of a vibrating table or the like; however, a driven main conveyor belt 50 is preferred. At a point along the main conveyor belt 50, a magnetic field is induced over the aggregate to separate or pull the iron-filing coated shells and any loose iron filings from the aggregate. As shown, the preferable method is for the separator 46 to include a secondary conveyor belt 52 disposed about a separator roller 54 which is a magnet, either a permanent magnet or an electromagnet. The shells and iron filings are drawn to the separator roller 54 where they are deposited on the secondary conveyor belt 52. The secondary conveyor belt 52 transports the shells and loose filings away from the meats for deposit in a shell bin 56. Main conveyor belt 50 may also be disposed and rotated about a magnetized, auxilliary separator roller 58 which retains any iron filings and shells which escape separation at roller 54 for ultimate deposit in an auxilliary shell bin 60. To remove any chafe from the aggregate, one or a number of air nozzles 61 may be provided and the main conveyor belt 50 may be constructed from a mesh material. As the aggregate is transported, the air nozzle 61 blows air through the aggregate to lift and direct the light chafe to a collection vent or the like (not shown).

While the foregoing method may be practiced on a continuous basis, batch or partial processing may also be employed. For example, the nuts discharged from the drum 42 may be conveyed to storage for cracking and separation at a later time. Alternatively, or in conjunction therewith, the aggregate discharged from the cracker 44 may also be conveyed to storage for later separation.

While the method shown in FIG. 1 and described above illustrates the broad aspects of the present invention, practice thereof has found that some nutmeats may be retained by the magnetically separated shells deposited in the main and auxilliary shell bins 56 and 60. To recover the residual meats, additional steps may be employed according to FIG. 11.

Figure 11:
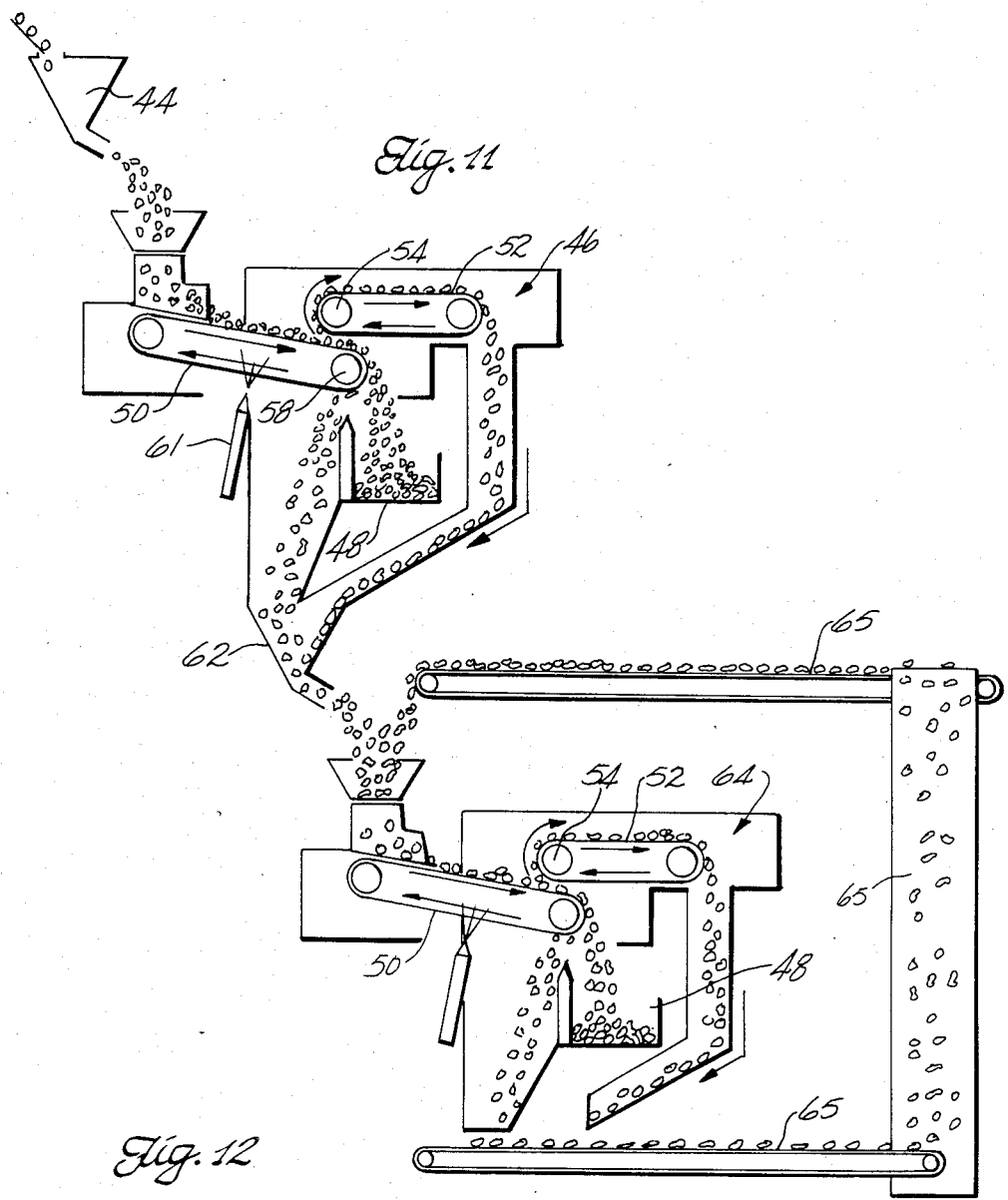
FIG. 11 is a schematic view illustrating further processing of the nutshell according to the method shown in FIG. 1.

As shown in FIG. 11, the aggregate discharge from the cracker 44 is fed into the separator 46. The shells and loose filings, rather than being deposited in the main and auxilliary shell bins 56 and 60, are instead transported by suitable means to a second cracker 62 having a finer setting than cracker 44 to further crack the shells and release the residual meats and produce a finer discharged aggregate. The discharged aggregate is in turn fed into a second separator 64 of construction identical to the separator 46 and including main and secondary conveyor belts 50 and 52 or repeatedly through the first separator 46. Since the aggregate feed into the second separator 64 is of a finer consistancy, its separating roller 54 is disposed closer to the main conveyor belt 50 than was the case with the separator 46. In the manner similar to that described above, the residual meats are deposited in the meat bin 48 of the second separator 64 whereas the shells and loose iron filings are magnetically separated from the aggregate. The separated nutshells and loose filings are returned and again fed into the second separator 64 for a second pass therethrough.

Alternatively, the nutshells separated by the separator 46 are stored until the entire batch has been processed. Thereafter, the cracker 44 is set to produce a finer aggregate and the separator 46, in a manner described in detail below, is adjusted to space the separator roller 54 closer to the main conveyor belt 50.

Under prior art methods, an undesireable amount of the nutmeat has been discarded with the nutshells as being non-recoverable from a process or from a cost effective standpoint. Under the process described above and substantially shown in FIG. 11, more nutmeat can be quickly, efficiently and inexpensively recovered. If desired, this percentage of discarded meat may further be reduced by additional cracking and separating steps.

As an added feature of the method disclosed in FIG. 11, the process inherently grades the nutmeats by size. The nutmeats after separator 46, due to the setting of the cracker 44, will be of a larger average size than those deposited at the second separator 64.

Figure 17:
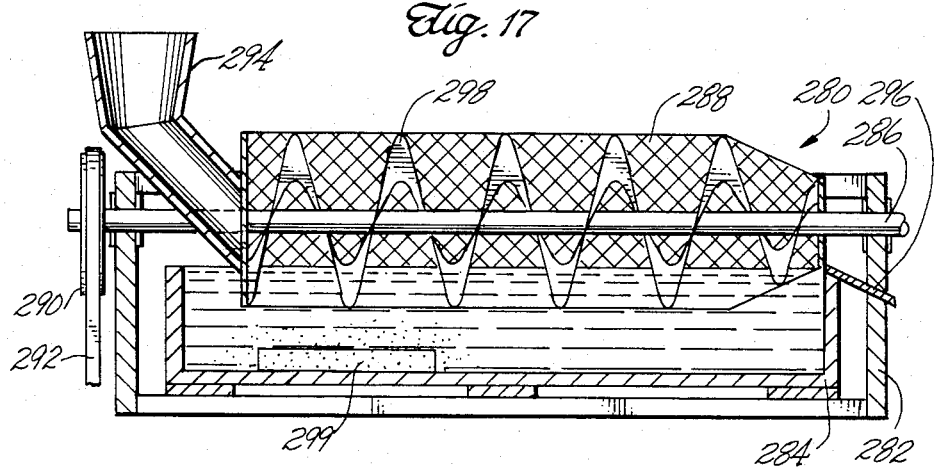
FIG. 17 is a schematic view showing recovery of the magnetic substance from the separated shells.

Still another advantage of the method shown in FIGS. 1 and 11, and described above, relates to the recovery of the magnetic substance and disposal of the shells. Since the preferred binder is a water-soluble animal glue, recovery can take place without using toxic solvents. A suitable method, as shown in FIG. 17, is to feed the separated shells into a shell cleaner 280. The cleaner 280 includes a frame 282 supporting a closed container 284 holding a quantity of hot or boiling water. A rotatable shaft 286 journaled at both ends to the frame 282 extends over the container 284 to mount a mesh cleaning cylinder 288. As can be appreciated from FIG. 17, the cylinder 288 is partially submerged in the water. Keyed to the shaft 286 outboard of the frame 282 is a sheave 290 rotated by a belt 292 which, in turn, rotates the shaft 286 and the cylinder 288. To admit coated shells into and discharge cleaned shells from the cylinder 288, the cleaner 280 includes a feed chute 294 and discharge chute 296 respectively. To move the shells through the cylinder 288 from the feed chute 294 to the discharge chute 296 a spiral track 298 is disposed around the inside wall of the cylinder 288. Accordingly, as the cylinder 288 is rotated, the track 298 urges the shells through the cylinder 288 and the hot water which dissolves the binder to free the iron filings. The freed filings fall through the mesh into the container 284 where they may be collected by, for example, a magnet 299. To dry the filings for reuse, a centerfuge, dryer or the like may be used. The shells stripped of the glue coating and magnetic substance are discharged from the cylinder 288 to the discharge chute 296 for collection to be sold for filler, burned as fuel, or otherwise used to good effect.

Figure 2:
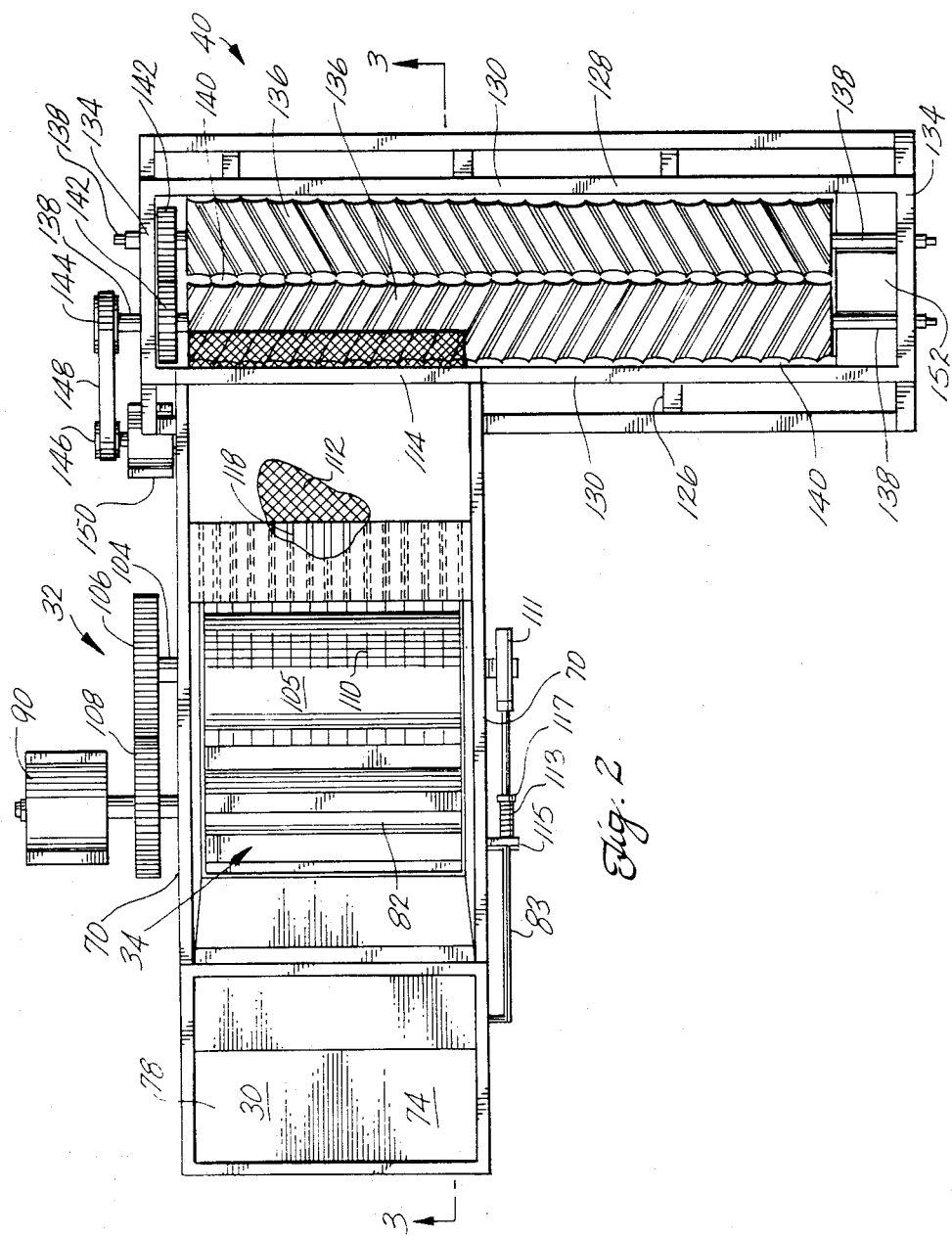
FIG. 2 is a top view of the apparatus for coating and normalizing the coating on the nutshells.
Figure 3:
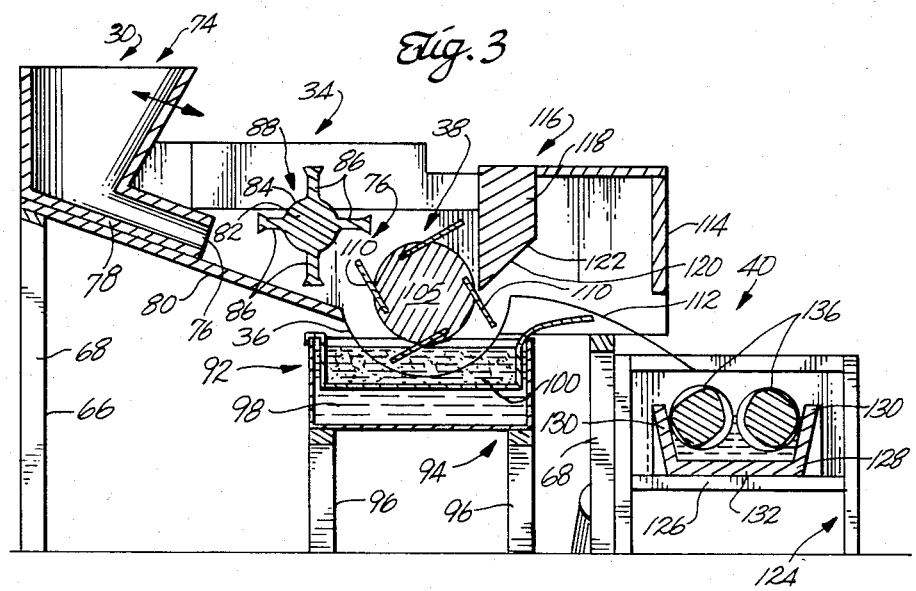
FIG. 3 is a section of the apparatus of FIG. 2 taken along line 3—3.

Turning to FIGS. 2 and 3, the glue applicator 32 and normalizer 40 are shown in detail. The glue applicator 32 has a frame 66 including a number of upstanding legs 68 supporting a pair of spaced parallel sidewalls 70 and a bottom wall 80. The feed hopper 30 is disposed at one end of the frame 66 and is adapted to be supported by and reciprocate along the bottom wall 80. Feed hopper 30 has a top inlet 74 to admit whole nuts with a lower discharge 76 disposed to drop the nuts into the basin 36 via metering roll 82. The hopper 30 also includes a bottom 78 disposed between the sidewalls 70 on top of the bottom wall 80 to hold the nuts and direct them to the discharge 76.

To prevent nuts from jamming in the hopper 30, the hopper 30 is movably disposed on the frame 66 and is provided with reciprocating means as shown at FIG. 3A. The bottom 78 is slidably supported on the bottom wall 80. A brace 81 is connected to the outside of the hopper 30 and is coupled to a rod 83 driven in a manner described in detail below to reciprocate the hopper 30 in a direction toward and away from the basin 36.

To meter the nuts from the hopper discharge 76 into the basin 36, a metering means such as the metering roll 82 is provided. The metering roll 82 is rotatably supported between the frame sidewalls 70 above the bottom wall 80 and is adapted to rotate in a direction counter to the direction of roll of the nuts down the bottom wall 80. The metering roll 82 includes a hub 84 mounting four radially outwardly projecting vanes 86. The vanes 86, as can be appreciated in FIG. 3, are disposed at 90° intervals about the hub 84 and are flared outward at their connection to the hub 84 and at their outermost edges. Vanes 86 cooperate to define four angular, longitudinally extended compartments 88 to receive a quantity of nuts from the hopper 30.

To drive the metering roll 82, drive means such as a variable speed drive motor 90 attached to the frame 66 and coupled to the hub 84 rotates the metering roll 82 at a desired rate. As can be appreciated, rotation of the metering roll 82 transports a quantity of nuts in the compartments 88 from the hopper discharge 76 around the metering roll 82, the nuts being dumped into the basin 36. By controlling the size of the metering roll 82 and thereby the compartments 88 and the speed of the motor 90, the rate the nuts are fed into the basin 36 can be regulated.

Nuts dispensed from the metering roll 82 are supplied to the glue applicator basin 36 for immersion in a glue bath. The basin 36 is semi-cylindrical and preferably is fashioned from a mesh material such as a screen having mesh smaller than the nuts to prevent nuts from falling therethrough. The mesh basin 36 is submerged in a binder bath generally shown as 92. The binder in the bath 92 is preferably an animal glue which is non-toxic and water soluble. As described below, the water solubility and non-toxic nature of the animal glue facilitates recovery of the glue and the iron filings from the nutshells.

The glue bath 92 includes a frame 94 having a pluralty of upstanding legs 96, the frame 94 and legs 96 supporting a water filled tank 98. Disposed in the tank 98 is a rectangular glue tray 100 into which the basin 36 extends and which holds a quantity of the aforesaid animal glue.

To make the glue less viscous, the glue in tray 100 is heated to a temperature of about 140° to 160° F. The method preferred to heat the glue is to heat the water with an electric heater or the like in the tank 98 to 140° to 160° F., the water in turn heating the glue in the glue tray 100. The glue tray 100 is of a size to immerse the basin 36 over its entire longitudinal length.

To positively move the nuts through the basin 36 for immersion in the glue, the glue applicator 32 includes the dip roll 38 as shown in FIGS. 2 and 3. The dip roll 38 has a shaft 104 supported by bearings between the side walls 70 for rotation. To properly move the nuts, the dip roll 102 is adapted to rotate in a direction opposite that of the metering roll 82 and accordingly has a gear 106 connected to the shaft 104 outboard of the sidewalls 70, the gear 106 meshing with a gear 108 coupled to on the hub 84 of the metering roll 82 outboard of the frame side walls 70. Accordingly, drive of the metering roll 82 by the motor 90 counterrotates the metering roll 82 and the dip roll 102 in the desired manner.

Carried by the shaft 104 between frame walls 70 is a coaxial cylinder 105 including four rows of spines 110 spaced 90° apart and sloped away from the direction of rotation. Each spine 110 is of a length to follow, in a closely spaced relationship, the contour of the basin 36 and is spaced from adjacent spines 110 of each row so as not to pass the nut therebetween. Accordingly, rotation of the dip roll 102 drives or pushes the nuts through the basin 36 where they are totally immersed in and completely covered by the glue.

To reciprocate the hopper 30, a cam 111 disposed on the shaft 104 is provided. The cam 111 drives the rod 83 which is coupled to the hopper 30. A spring 113 interconnected between a sidewall mounted support 115 and a washer 117 connected on the rod 83 cooperates with the rod 83 and cam 111 to reciprocate the hopper 30 and prevent the nuts from jamming the discharge 76.

From basin 36 of applicator 32, the glue coated nuts are delivered by the rows of spines 110 to a discharge ramp 112 leading to the normalizer 40. Like the basin 36, the ramp 112 is preferably constructed of mesh material, the mesh being fine enough so as not to pass the nuts therethrough. Accordingly, excess glue applied to the nuts is permitted to drop through the mesh ramp 112. The ramp 112 is sloped downward so that the nuts tumble along the ramp 112 to the normalizer 40 beneath a protective forward wall 114 disposed between the sidewalls 70.

To assure that the glue coated nuts, which may adhere to the rows of spines 110, are not carried over past the ramp 112, the glue applicator 32 includes a comb 116 disposed above the interface between the basin 36 and the ramp 112 and between the sidewalls 70. The comb 116 is fashioned from a plurality of trapezoidal members 118 suspended and spaced to pass between the spines 110 of each row on the dip roll 102. As shown in FIG. 3, each member 118 has a triangular tip 120 with an angular edge 122, the tip 120 and edge 122 cooperating to remove any adhering nuts from the row of spines 110 and discharge them to the ramp 112. Accordingly, nuts are prevented from being carried over into the hopper discharge 76 to jam the glue applicator 32.

The normalizer 40 is adapted to tumble and convey the nuts and dilute the glue covering to a substantially uniform, optimum coating of glue. To accomplish this purpose, the normalizer 40 includes a frame 124 having horizontal intermediate cross members 126 supporting a longitudinally extended tub 128. The tub 128 has opposed sides 130 converging toward a horizontally disposed bottom 132, secured to and supported by the cross members 126. Ends 134 are disposed between the sides 130 and bottom 132 to define the closed tub 128 adapted to hold a quantity of water or other glue solvent.

To tumble the nuts and to dissolve the glue on each nut to a uniform, optimum coating, the normalizer includes at least one and preferably a cooperative pair of counterrotating feed screws 136. Each screw 136 has a shaft 138 supported for rotation at each end of the frame 124 by bearings or the like. The screws 136 have threadlike helical projections of opposite twist so that the side-by-side screws 136 cooperate to define a plurality of pockets 140 along the length of and between the screws 136. Each pocket 140 is adapted to receive, hold and tumble at least one walnut as the screws 136 are counterrotated. As can be appreciated from FIG. 3, during operation the rotation of the screws 136 is such that, at the pockets 140 between the screws 136, the screws 136 have a generally upwardly directed angular velocity for tumbling the nuts and to prevent nuts from becoming lodged between the screws 136. Accordingly, the nuts leaving the glue applicator 32 are discharged into the normalizer 40, the nuts being received by the pockets 140. As the screws 146 rotate, the pockets 140 are, in effect, moved along the lengths of the screws 136, the rotation of the screws 136 tumbling the nuts.

To normalize the glue covering on the nuts to a uniform, optimum coating, at least one and preferably each screw 136 is partially submerged in the water or glue solvent located in the tub 128. To further enhance the dilution effect and speed the process of normalizing the coating on the nut, the water in the tub 128 may be heated by a heater to a temperature of approximately 140° to 160° F.

To drive the screws 136 for counterrotation, each screw 136 may have keyed to its shaft a gear 142, the gears 142 meshing as shown in the drawings. A shaft 138 of one of the screws 136 extends outboard of the frame 124 and has a sheave 144 keyed thereto. The sheave 144 is coupled to a pulley 146 by means of a drive belt 148, the pulley being driven by a variable speed motor 150. Accordingly, by the fact of the intermeshing gears 142, rotation of the motor 150 counterrotates the screws 136 in the desired manner. It is to be understood, however, that other screw drive means can be used such as separate motors, a motor driven gear box or the like.

The nuts fed into the normalizer 40 from the glue applicator 32 are non-uniformly covered with the glue. As the nuts tumble from the ramp 112 into the normalizer 140, one or more nuts are deposited in each pocket 140. The counterrotation of the screws 146 tumbles the nuts as they are transported from the end of the normalizer 40 near the ramp 112 to a discharge chute 152 located at the other end of the normalizer 40. Since the screws 136 are partially submerged and coated with the solvent, herein water, the rotation of the screws 136 not only tumbles the nuts but also brings the solvent into contact therewith. The tumbling action and contact of water removes excess glue on each nut and dissolves the coating to a uniform, optimum coating according to the desired characteristics set forth above.

To adjust the coating, depending upon a variety of factors including the ambient conditions, the speed of rotation of the screws 136 or the length or twist of the screws may be modified. In any case, the nuts discharged from the normalizer 40 into the chute 152 have a uniform, optimally thick tacky coating ready to accept the iron filings.

From the chute 152, the nuts are transported as by rolling along a trough 154 to the dusting drum 42 as shown in FIGS. 4-7. To remove any excess coating remaining on the nuts, to prevent distortion of the uniform coating and to assure movements of the nuts, a meshed screen 156 is disposed in and along the trough 154 to carry the nuts. For example, in the continuous processing of the nuts, small amounts of glue would gradually build up in a solid chute destroying the uniform coating and causing the nuts to form unmanageable clusters or catch the nuts to jam the trough 154.

To deposit the coating of iron filings, the drum 42 is cylindrical having a generally closed inlet end 158 and discharge end 160. The drum 42 is adapted to receive the glue coated nuts in a continuous manner and to intermix the nuts with iron filings. While it has been found that using a very fine iron powder with a density of about 3 grams per cubic centimeter and the following U.S. standard sieve analysis:

| | |
|---|---|
| +200 | 1.0% |
| +325 | 3.0% |
| −325 | 96.0% | is effective for the practice of this invention, that a coarser grade of iron filings is preferred to better facilitate separation of the shells from the meat and recovery of the iron filings. Preferably, the iron filings should have a density of about 2.8 gm/cc and a U.S. standard sieve analysis of:

| | |
|---|---|
| −40 + 80 | 55% |
| −80 + 200 | 43% |
| −200 | 2% |

The preferable iron filings have been obtained from Hoeganaes Corporation of Riverton, N.J. under the name of Ancor Welding Powder W-428.

Figure 4:
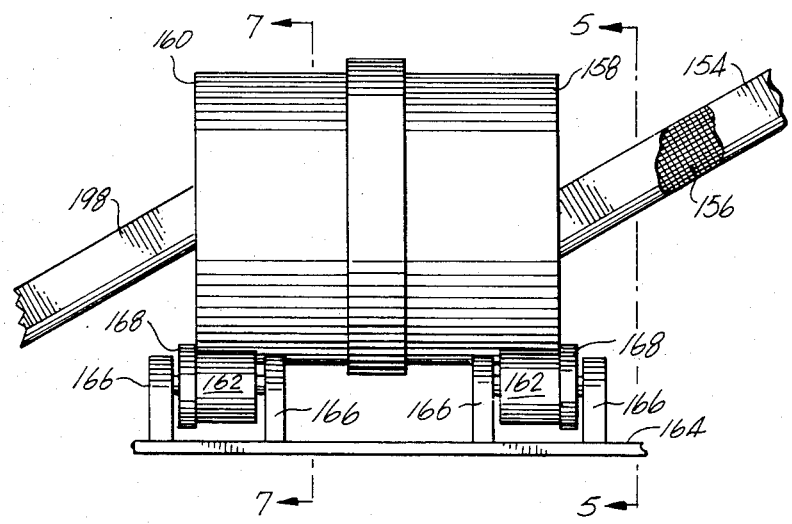
FIG. 4 is a side view of the dusting drum which dusts particles of a magnetic substance on the binder coated nuts.

To provide the aforesaid mixing, the drum 42 is arranged to have its axis substantially horizontally arranged, the drum 42 being rotated about the horizontal axis by suitable means. As shown in FIGS. 4 and 5, the rotating means as presently envisioned includes four rollers 162 each supported for rotation about a horizontal axis above a skid 164 by a pair of supports 166. One pair of the rollers 162 is disposed to support the inlet end 158 of the drum for rotation, each roller 162 having a radially outward projecting flange 168 to abut the inlet end 158 and prevent movement of the drum 42. The remaining pair of rollers 162 support the discharge end 160 in a similar manner. To rotate the drum 42, a variable speed motor 170 is provided, the motor having a pulley 172 to drive a belt 174. The belt 174 is, in turn, wrapped about and adapted to rotate a sheave 175 mounted to a rotatable shaft 177 supported by uprights 179. Also mounted on the shaft 177 is a pulley 181 mounting another belt 183 which drives yet another rotatable sheave 185. Rotation of the sheave 185 drives a drive belt 187. The drive belt 187 is wrapped about the outside of the drum 42. The outside of the drum 42 may be provided with ribs 176 to maintain engagement between the drive belt 187 and the outside of the drum 42.

Accordingly, operation of the motor 170 through the belts 174, 183 and 187 rotates the drum 42 about its horizontal axis supported by the rollers 162 to intermix the nuts and iron filings. It is to be understood that the drive arrangement of the drum 42 may be modified by, for example, providing a gear or direct drive to rotate the drum 42 or sloping the rotational axis of the drum 42.

To admit the nuts, the drum 42 includes an inlet 180 extending into the interior of the drum. The chute 154 is arranged to supply the coated nuts through the inlet 180. Similarly, to discharge the nuts from the drum 42, the drum 42 includes a coaxially arranged, axial bore defining an outlet 184.

Figure 7:
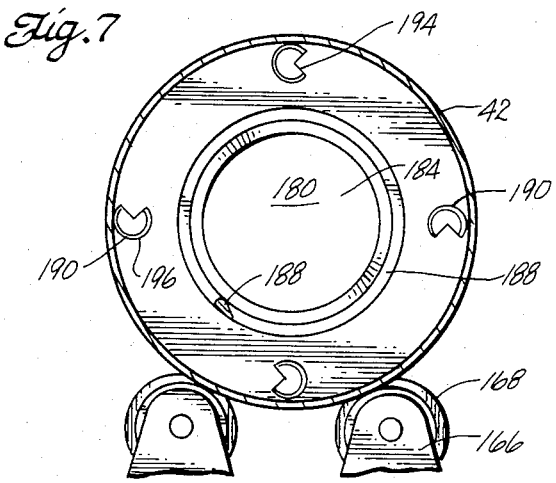
FIG. 7 is a section view of the dusting drum of FIG. 4 taken along line 7—7.

To provide a path along which the nuts pass through the interior of the drum 42, a cylindrical, mesh tunnel 186 extends between the inlet and discharge ends 158 and 160. Tunnel 186 is located coaxially of the drum in spaced relationship to the walls of the drum. As can be appreciated, the nuts entering the drum 42 at the inlet 180 tumble around and through the tunnel 186 toward the outlet 184. To convey the nuts through the tunnel 186 from the inlet 180 to the outlet 184 is a track 188 spirally disposed around the inside of the tunnel 186. As seen in FIGS. 6 and 7, the track 188 projects inward from the tunnel 186 and spirals from the inlet end 158 to the discharge end 160 to urge the nuts through the tunnel 186 and to exit from the outlet 184 when the drum 42 is rotated.

To sprinkle the supply of iron filings onto the nuts, the drum includes tubes 190 attached to the wall of the drum 42 and spaced from the inlet and discharge ends 158 and 160. The tubes 190 are disposed at 90° intervals about the drum 42 and pass along the annulus defined between the tunnel 186 and the drum 42. As best shown in FIG. 7, each tube has a mouth 194 which represents approximately 90° of the circumference of each tube 190 and is disposed along the length of the tube 190 at the side directed in the direction of rotation of the drum 42. A portion of each tube 190 facing the tunnel 186 representing approximately 90° of the circumference of each tube 190 includes rows of holes 196. As can be appreciated, when the drum 42 is rotated, each tube 190 scoops a portion of iron filings disposed along the bottom of drum 42 with its mouth 194. As the drum 42 continues to rotate, the iron filings scooped by each tube 190 fall through the holes 196 as each tube 190 progresses from its lowermost point, to its highest point and back to its lowermost point. Accordingly, it can be appreciated that as the nuts pass through the tunnel 186 from the inlet end 158 to the discharge end 160, iron filings fall from the tubes 190 to dust the nuts therewith. The nuts, whose coatings have captured the filings, are discharged from the drum 42 via the outlet 184 to transport means preferably embodied as a cracker feed chute 198.

Figure 12:
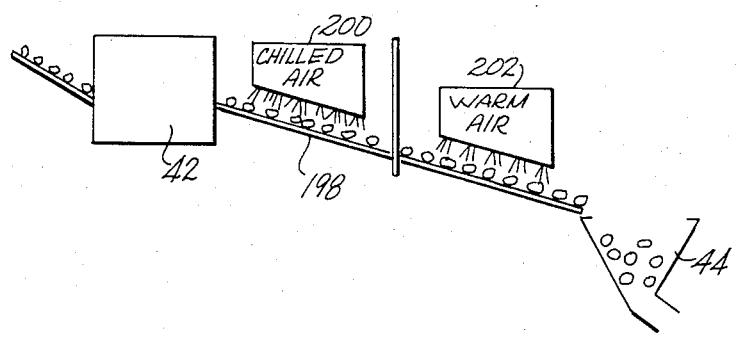
FIG. 12 is a schematic view of a portion of the method illustrated in FIG. 1 showing variations thereto for setting the binder coating.

Depending upon a variety of considerations such as ambient temperature, humidity, the adjustment of the normalizer 40, the coatings of the nuts as they leave the drum 42 should be dry or set. By being dry, what is meant is that the nuts can be handled without being sticky or redepositing the iron filings when touched. However, to assure complete setting of the dusted coating of the nuts leaving the drum 42 in, for example, hot and humid environments, the nuts leaving the drum 42, as shown in FIG. 12, may be first chilled by blowing air from a chiller 200 over the nuts as they pass through the cracker feed chute 198 and thereafter heated by blowing warm air from a heater 202 over the nuts as they tumble along the cracker feed chute 198. It has been found that chilling the coating with air which is a few degrees below ambient temperature and then blowing warm air, a few degrees above ambient temperature, quickly and efficiently sets or dries the glue.

The nuts having the dried coating, including iron filings, are discharged from the cracker feed chute 198 into the cracker 44. The cracker 44 is of a well-known design and is adjustable to crack the nuts to have an output of an aggregate of cracked nut shells and meats of the desired fineness. The aggregate, which may also include some loose iron filings and chafe is thereafter transported by suitable means to the separator 46 for separation of the shells from the aggregate.

Figure 10:
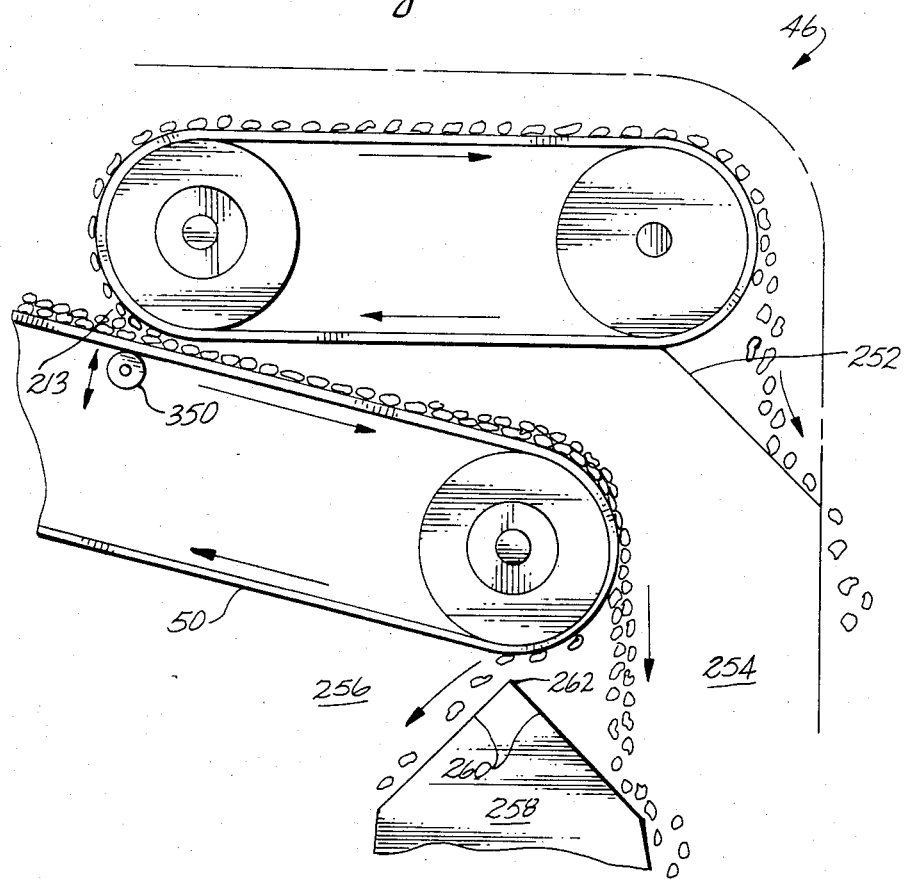
FIG. 10 is a partial view of the separator of FIG. 8.

As shown in FIGS. 8 through 10, the separator 46 has a frame supporting spaced, upstanding side walls 206. At the upper regions of the separator 46 near one end of the frame 204, a supply funnel 208 is provided to receive the aggregate discharged from the cracker 44.

Since, in the processing of the nuts, the aggregate discharge from the cracker 44 may not be at a continuous, uniform rate, the separator 46 includes a reciprocating chute 300 located beneath the funnel 208. As shown in FIG. 18, the reciprocating chute 300 is L-shaped and is supported at one end by a flexible coupling 302 interconnected between the frame 204 and the reciprocating chute 300. The flexible coupling 302 may be a strip of metal, a spring or the like. To support and guide the other end of the chute 300, a pair of pillow blocks 304 (only one shown in FIG. 18) are provided. Each pillow block 304 is approximately of a Z-shape defining a horizontal bearing surface 306 adapted to engage and slide along an upper surface 308 of one of the sidewalls 206. A pin 310 interconnects each pillow block 304 to the reciprocating chute 300.

To reciprocate the chute 300, a rod 312 is interconnected between one of the pillow blocks 304 and a sheave 314 journaled outboard of the frame 204. As shown, the rod 312 is eccentrically attached to the sheave 314. When the sheave 314 is rotated in a manner described below, the rod 312 and chute 300 are caused to reciprocate supported by the sliding of the pillow blocks 304 along the upper surfaces 308 and the coupling 302. The aggregate supplied through the funnel 208 falls into the reciprocating chute 300 which dispenses into the separator 46 at the desired rate. It should be noted that the chute 300 should be somewhat angled to permit the aggregate to pass therethrough into the separator 46. The angle, and thereby the rate, may be altered by adjusting the coupling 302 as may be the speed of reciprocation by changing the speed of the sheave 314.

As stated above, the separator 46 is adapted to move the aggregate and a magnetic field relative to one another to separate the iron filing coated shells therefrom. While one means for relative movement would be to pass a magnet over stationary or moving aggregate, the preferred method according to the present invention is to move the aggregate past a magnetic field located at a desired point in the path of movement of the aggregate. Accordingly, to transport the aggregate dispensed from the reciprocating chute 300 for magnetic separation of the shells from the nutmeat, the separator 46 includes transporting means preferably embodied as the main conveyor belt 50. To support the main conveyor belt 50, the separator 46 has a first drive roller 220 supported for rotation between the sidewalls 206 near the funnel, the auxillary separator roller 58 also similarly being disposed between the sidewalls 206 near the other end of the frame 204 and supporting the main conveyor belt 50. Roller 220 preferably is disposed above roller 58 so that belt 50 moves along a downwardly sloping path from roller 220 to roller 58. The first drive roller 220, as do the other rollers hereinafter described, includes a shaft 222 supported for rotation between the sidewalls 206 by, for example, a pair of bearing blocks 224. Coaxially disposed about the shaft 222 is the enlarged roller cylinder 226 adapted to support the main conveyor belt 50.

To drive the first drive roller 220, and thereby the main conveyor belt 50 to transport the aggregate from the reciprocating chute 300, the first drive roller shaft 222 is extended at one end outboard of the sidewall 206 to coaxially mount a sheave 228 and a pulley 230. Disposed about and rotating the sheave 228 is a main conveyor drive belt 232 which is driven from a pulley 234 rotated by a variable speed motor 236 mounted on the separator 46. To drive the reciprocating chute 300, the sheave 314 and thereby the reciprocating chute 300, is rotated by a belt (not shown) which is driven from the pulley 232 disposed upon the first drive roll shaft 222. As can be appreciated, operation of the motor 236 drives the drive belt 232 and thereby the first drive roller 220 and also reciprocates the chute 300.

Drive of the first drive roller 220, in turn, rotates the main conveyor belt 50 to transport the aggregate from the reciprocating chute 300 through the separator 46.

To center the aggregate away from the edges of the main conveyor belt 50, the separator 46 includes curbs 242 disposed along the inside of the sidewalls 206 adjacent the main conveyor belt 50.

As can be appreciated from FIG. 8, the main conveyor belt 50 travels in a downward sloped direction carrying the aggregate therewith. To assure that the aggregate is evenly distributed over the width of the belt 240 between the curbs 242, a spreader plate 244 is mounted between the sidewalls 206 over the main conveyor belt 50. The plate 244 is somewhat angled to one side as shown in the drawings. Accordingly, aggregate dispensed onto the main conveyor belt 50 from the reciprocating chute 300 is spread over the main conveyor belt 50 for subsequent magnetic separation of the shells from the aggregate.

To remove any chafe from the aggregate, nozzles (not shown in FIGS. 8 and 9) may be provided to blow air through the main conveyor belt 50 and the aggregate. The air lifts the light chafe for deposit in a collection vent or the like.

To magnetically separate the nutshells from the nutmeats, the separator 46 includes the secondary conveyor belt 52 located, as seen in FIGS. 8 and 10, above the main conveyor belt 50 to define a passageway 213. The secondary conveyor belt 50 is supported for rotation and is driven by the main separator roller 54 located slightly above the main conveyor belt 50 intermediate of the first drive roller 220 and the auxillary separator roller 58. At the other end, the secondary conveyor belt 52 is supported for rotation by a support roller 246. To drive the secondary conveyor belt 52, the auxillary separator roller shaft 222 includes, outboard of the sidewalls 206, a pulley which, via drive of the main conveyor belt 50, drives a belt 148. The belt 148 is, in turn, disposed about a sheave 50 disposed on the main separator roller shaft 222 outboard on the sidewalls 206. It has been found that for efficient separation of the shells from the aggregate, that the secondary conveyor belt 52 should be run at a lineal speed approximately twice that of the main conveyor belt 50. This assures that the shells coated with the iron filings are rapidly picked up and removed from the aggregate, thereby preventing jamming of the passageway 213. It should be noted that the speed of the secondary conveyor belt 50 has a maximum limit at which the shells are no longer efficiently removed from the aggregate.

To operate the separator 46, the motor 236 is started which causes the reciprocating chute 300, main conveyor belt 50, and secondary conveyor belt 52 to move. Aggregate fed into the funnel 208 is dispensed via the reciprocating chute 300 onto the moving main conveyor belt 50, the aggregate being spread evenly over the belt between the curbs 242 by the plate 244. Upon reaching the passageway 213, the filing-coated shells in the aggregate, and also any loose filings in the aggregate coated with iron filings, are pulled from the aggregate by the magnetized main separator roller 54 which deposits them on the secondary conveyor belt 52. Due to the slope of the separator roller 54, it has been found that for some magnets the magnetic field is weak, if not inadequate, at or near the sidewalls 206. Accordingly, the curbs 142 center the aggregate on the main conveyor belt 50 for efficient separation.

The shells travel on the secondary conveyor belt 52 around the main separator roller 54 away from the main conveyor belt 50. The shells carried on the secondary conveyor belt 52 travel toward the support roller 246 where they are discharged from the separator 46 to a shell discharge chute 252 for collection in the main shell bin 56. The aggregate, freed of the majority of the shells and loose filings, travels undisturbed through the passageway 213 beneath the second conveyor belt 52 to the magnetized auxiliary roller 58. The nutmeats, undisturbed by the magnetic field set up by the auxilliary separator roller 58, fall from the main conveyor belt 50 and are deposited into a meat chute 254 which directs the meats to the meat bin 48. Any shells or loose filings which may pass through the passageway 213 without being picked up by the main separator roller 54 are retained against the main conveyor belt 50 by the magnetized auxilliary separator roller 58 past the meat chute 254 where they are deposited in an auxilliary shell discharge chute 256 disposed where the main conveyor belt 50 separates from the auxilliary separator roller 58.

As shown in FIGS. 8 and 10, to provide a clear demarcation between the meat and auxilliary shell discharge chute 254 and 256, a divider 258 having angular top walls 260 converging to a dividing edge 262, which extends between the sidewalls beneath the auxillary separator roller 58, may be provided.

Figure 16:
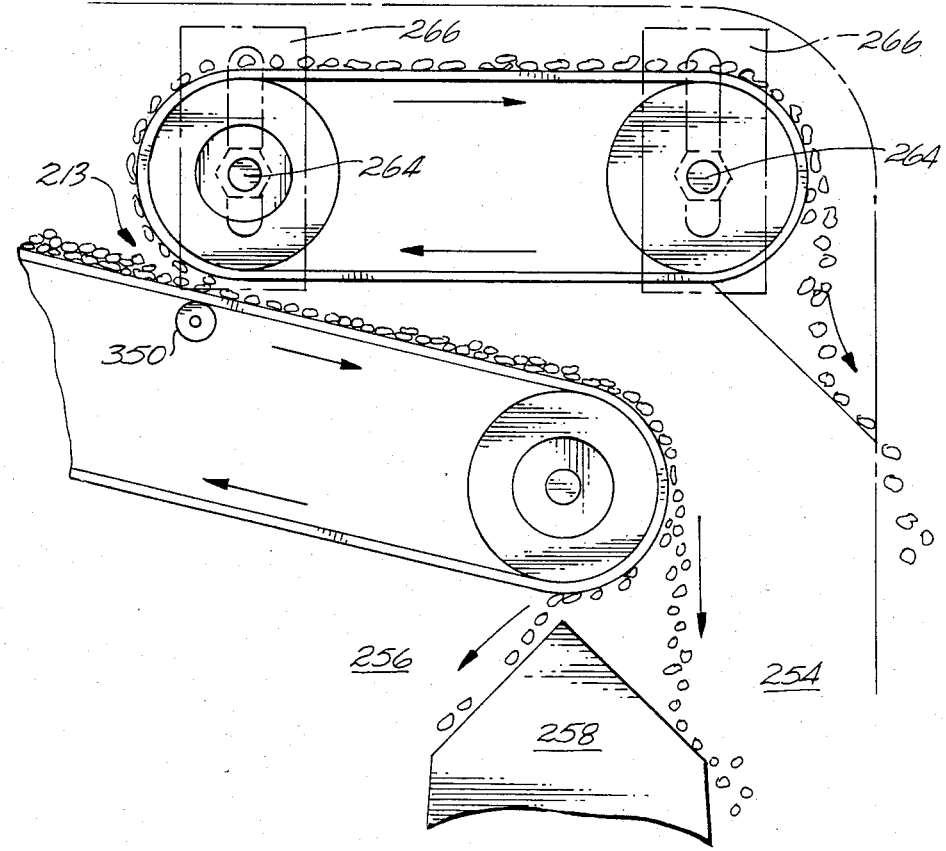
FIG. 16 is a partial view similar to that of FIG. 10 illustrating adjustment of the separator to accommodate a smaller size aggregate of cracked nutshells and meats.

As stated above, the cracker 44 may be set to determine the degree of fineness of the aggregate discharge therefrom. Referring to FIG. 11, several crackers may be provided, each having different settings, to produce a finer and finer aggregate. Depending upon the fineness of the aggregate, it may be desirable to move the main separator roller 54 and the entire secondary conveyor belt 52 relative to the main conveyor belt 50. As shown in FIG. 16, one means to accomplish the aforesaid adjustment is to support the main separator and support roller shafts 222 on movable bearings 264 disposed in slotted holders 266 mounted to the sidewalls 206. To adjust the position of the main separator roller 54 or the secondary conveyor belt 52 the movable bearings 264 are positioned along the holders 266 to the selected location and held in place by suitable means.

Another means to adjust the size of the passageway 213 is to provide an adjustable roller 350 below the main conveyor belt 50. The roller 350 may be vertically adjusted to, accordingly, adjust the size of the passageway 213.

To handle smaller nuts such as pecans, the aforesaid process and apparatus function in substantially the same manner. However, due to the smaller size of the pecans, the normalizer 40 must be modified to prevent the pecans falling through the pockets 140. One method for so doing is illustrated in FIGS. 13 and 13A. To decrease the size of the pockets 140 to handle pecans, the normalizer 40 has a bar 268 disposed along the lengths of the screws 136 to bifurcate the pockets 140. The bar 268, in effect, reduces the size of the pockets 40 to accommodate the pecans. The pecans, falling into the normalizer 40, are tumbled between the counterrotating screws and the bar 268 to normalize the glue covering to the uniform, optimum coating.

Another method for modifying the normalizer 40 to accommodate pecans is to provide that one or both of the screws 136 be adjustable as shown in FIGS. 14 and 15. Accordingly, one of the screws 136 may be supported at each end by bearings disposed in movable bearing casings 270. Each casing 270 has an arcuate lip 272 having a number of holes adapted to selectively register with one or more holes disposed in the end wall of the normalizer 40. As can be appreciated, to accommodate the relative movement of the screws 136, the sprocket drive described above may be replaced by the belt drive as shown in FIG. 14. Accordingly, adjustment of the screws 136 takes place along an arc coaxial to the drive shaft rotating the belts which in turn rotates the screws 136.

As is well known, in any particular harvest, nut halves and smaller pieces are intermingled with whole nuts. Since the foregoing methods and apparatus are adapted to handle only whole nuts, means are required to classify, i.e., separate the whole nuts from the harvest for processing.

Figure 20:
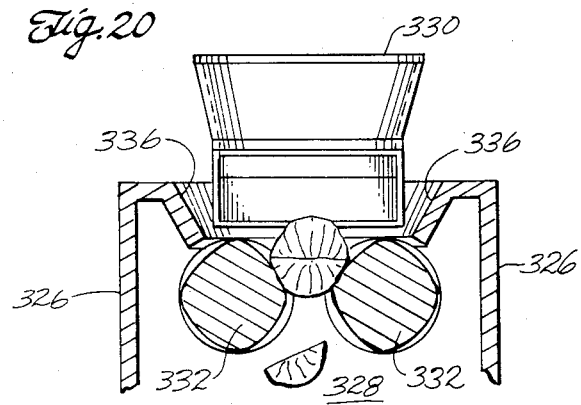
FIG. 20 is a section of the classifier taken along line 20—20 of FIG. 19.
Figure 21:
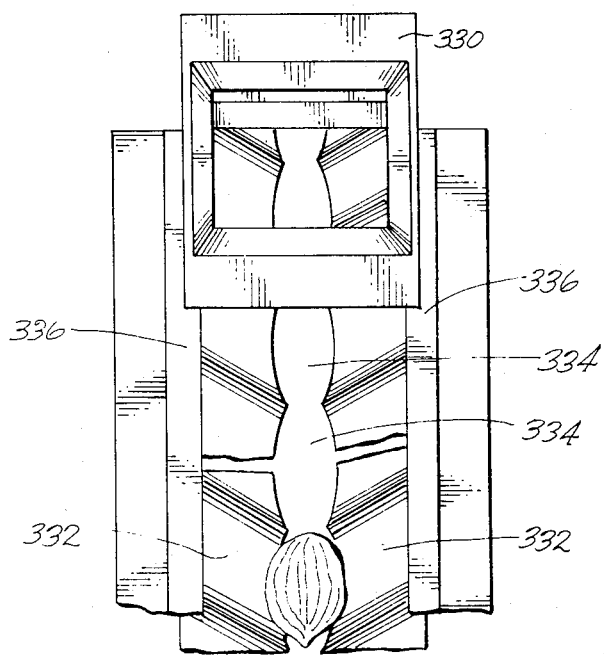
FIG. 21 is a top view of the classifier of FIG. 19.

To separate whole nuts from a harvest, a classifier 320, as shown in FIGS. 19-21, is provided. The classifier 320 has a frame 322 including spaced end walls 324, an intermediate wall 325, and side walls 326. The compartment defined between one end wall 324, the intermediate wall 325, and side walls 326 defines a first chute 328 adapted to receive nut halves and smaller pieces. The nut halves and the like may be hand or otherwise processed to remove the nutmeat or may be discarded and sold as filler or the like. Secured to one end of the frame 322 over the first chute is a feed chute 330 to receive the harvest either at a continuous rate or in intermittent batches. Rotatably disposed between the end walls 324 below the feed chute 330 are the shafts of a pair of counter-rotating screws 332 akin to those of the normalizer 40. The screws 332 are spaced from one another to define a number of eliptical, moving passageways 334, best shown in FIG. 21. As can be appreciated from the drawings, the screws 332 are positioned to cradle whole nuts while permitting nut halves and other pieces to fall through the passageways 334 into the first chute 328. Counterrotation of the screws 332 not only conveys the whole nuts to a second chute 336 between an end wall 324 and the intermediate wall 325 for collection, but also agitates the nuts to permit the nut pieces to fall through the passageways 334. To confine the nuts over the screws 332, the side walls 326 are provided with longitudinally extending angularly arranged curbs 336 as shown in extending angularly ranged curbs 336 as shown in FIGS. 20 and 21. The screws 332 are driven for counterrotation by a motor driven belt 338 disposed about and rotating a sheave 340 keyed to the shaft of one of the screws 332. Meshing gears 342 on the screw shafts counterrotate the screws 332 in the desired manner when the motor is operated.

As can be appreciated, the classifier 320 may have only one screw 332 to define openings or may be provided with three or more screws as desired.

In yet another embodiment of the present invention, the iron filings may be intermixed in the glue bath. The nuts leaving the normalizer 40 accordingly, have an optimum, substantially uniform coating of glue and iron filings. The coating may thereafter be dried or allowed to dry in a suitable manner before cracking. As can be appreciated, the mixing of the iron filings in the glue bath dispenses with the need for the dusting drum.

While we have shown and described certain embodiments of the present invention, it is to be understood that it is to be subject to modification without departing from the spirit and scope of the following claims.

What is claimed is:

1. A method for shelling a nut and for separating nut meat from nutshell pieces comprising the steps of:
   applying a hardenable binder comprising a glue to an unshelled nut for subsequently adhering ferromagnetic particles to the nutshell;
   treating the binder on the nutshell with a normalizer to form a coating of binder of predetermined thickness substantially uniformly over the entire exterior surface of the nutshell;
   thereafter applying to the binder on the nutshell ferromagnetic particles of predetermined size substantially uniformly over the binder-coated surface of the nutshell for adherence of the particles to the nutshell by the binder, to thereby render the nutshell and pieces thereof magnetically sensitive;
   thereafter cracking the nutshell to free the meat from the shell and to provide a mixture of magnetically sensitive nutshell pieces and of meats; and
   subjecting the mixture to magnetic forces to separate the magnetically sensitive nutshell pieces from the meats.

2. The method of claim 1 wherein applying the binder includes immersing the unshelled nut in a bath of the binder.

3. The method of claim 2 wherein immersing includes dipping the unshelled nut in a bath of water soluble animal glue.

4. The method of claim 3 further including heating the bath of animal glue.

5. The method of claim 4 including heating the bath of animal glue to a temperature of about 140° to 160° F.

6. The method of claim 1 wherein the step of treating includes tumbling the unshelled nut and reducing the binder to provide a substantially uniform coating of binder on the nutshell.

7. The method of claim 6 wherein the treating step includes simultaneously tumbling and dissolving the binder to a substantially uniform coating on the nutshell.

8. The method of claim 6 wherein the treating step includes conveying and tumbling the nutshell along at least one screw-type conveyor, the conveyor being coated with a binder solvent to dissolve the binder into a substantially uniform coating.

9. The method of claim 6 wherein the treating step includes conveying and tumbling the nut between a pair of counterrotating screws, the screws being coated with a binder solvent to dissolve the binder to a substantially uniform coating.

10. The method of claim 9 further including partially submerging the screws in a solvent bath to coat the screws with the solvent.

11. The method of claim 10 wherein the binder is a water soluble glue, the method including partially submerging the screws in a water bath.

12. The method of claim 11 including heating the water bath.

13. The method of claim 12 including heating the bath to about 140° to 160° F.

14. The method of claim 1 wherein the step of applying the ferromagnetic particles to the nutshell includes sprinkling iron filings over the nutshell.

15. The method of claim 1 wherein the step of applying the ferromagnetic particles to the nutshell includes tumbling the nutshell in the presence of a substantially dry particularized ferromagnetic substance.

16. The method of claim 1 wherein the step of applying ferromagnetic particles includes tumbling the nutshell in a drum containing a particularized ferromagnetic substance.

17. The method of claim 1 wherein the step of subjecting the mixture to magnetic forces includes moving the cracked nutshell pieces and meat relative to a magnetic field to separate the shell pieces from the meat.

18. The method of claim 17 wherein the step of subjecting the mixture to magnetic forces includes transporting the mixture along a path at a first speed and inducing a magnetic field at at least one point along the path to separate the nutshell pieces from the nutmeat and deposit such nutshell pieces for transport along a second path at a second speed.

19. The method of claim 18 further including the step of conveying the separated nutshell pieces along the second path to a location for disposal.

20. The method of claim 17 further including transporting the separated nutshell pieces to a cracking device, recracking the nutshell pieces to free any retained meat and moving the recracked nutshell pieces and freed nutmeat relative to a magnetic field to separate such recracked nutshell pieces from the freed nutmeat.

21. The method of claim 1 further including, performed between the steps of applying ferromagnetic particles and cracking the nutshell, the additional step of chilling the nut to set the coating.

22. The method of claim 21 including, performed after the chilling step, the step of heating the nut to set the coating.

23. A method for magnetically separating nutmeats from an aggregate of (a) cracked nutshells whose original exterior surfaces have been coated with ferromagnetic particles and (b) nutmeats which have been released from the cracked coated nutshells, the method comprising the steps of:
   distributing the aggregate on a support surface to form on the support surface an aggregate layer having substantially a predetermined depth;
   moving the support surface and the aggregate layer at a first speed relatively below a magnet disposed and defined to provide at the support surface a magnetic field of predetermined strength to thereby lift the coated nutshells from the aggregate layer to a second surface and to thereby leave nutmeats on the support surface;
   concurrently with moving the support surface, moving the second surface with the lifted nutshells thereon toward a nutshell collection location at a second speed greater than the first speed; and
   removing nutmeats left on the support surface from said surface at a nutmeat collection location.

24. The method according to claim 23 including the further steps of recracking the lifted nutshells to release from them any nutmeats contained therein and to create a second aggregate of cracked nutshells whose original exterior surfaces have been coated with ferromagnetic particles and of nutmeats which have been released from the recracked coated nutshells, and repeating the distributing, moving, concurrently moving and removing steps in connection with and upon the second aggregate.

25. The method according to claim 23 wherein the second speed is approximately twice the first speed.

26. The method according to claim 23 including moving the second surface relative to the support surface in a direction opposite to the direction of movement of the support surface relative to said magnet and said magnetic field.

27. The method according to claim 23 including the further steps of provide the second surface as the surface of a conveyor which can transmit a magnetic field therethrough, defining a path of movement of the conveyor which includes a first portion commencing at and extending away from said magnet and in which the lifted nutshells are supported on the conveyor, said path of movement also including a second portion below the first portion in which the conveyor moves toward the magnet, and a third portion between and connecting the first and second portions of said path, and providing at least at the third portion of the path of movement of the conveyor a second magnetic field effective upon lifted nutshells on the conveyor entering the third portion of said path in response to movement of the conveyor to hold said nutshells on the conveyor through at least an initial part of said third portion, to thereby cause any free nutmeats on the conveyor to fall from the conveyor in the said third portion before lifted nutshells fall from the conveyor.

28. A method for magnetically separating nutmeats from an aggregate of (a) cracked nutshells whose original exterior surfaces are coated with ferromagnetic particles and (b) nutmeats which have been released from the cracked coated nutshells, the method comprising the steps of:

adhering to the exterior surfaces of unshelled nuts, substantially uniformly thereover, ferromagnetic particles by use of a hardenable binder comprising a glue to form a ferromagnetic coating on the unshelled nuts;

thereafter hardening the binder on the unshelled nuts;

thereafter cracking the unshelled nuts to provide said aggregate;

distributing the aggregate on a moving support surface to form on the support surface an aggregate layer having substantially a predetermined depth;

moving the support surface and the aggregate layer along a path of movement through a magnetic field of predetermined strength at the support surface; and cooperatively defining said path of movement and disposing the magnetic field to cause the magnetic field to be effective upon the cracked nutshells to produce movement of the nutshells in response to the magnetic field differently from the movement of the nutmeats to thereby effect separation of the cracked nutshells from the nutmeats.

* * * * *